Figure 1:
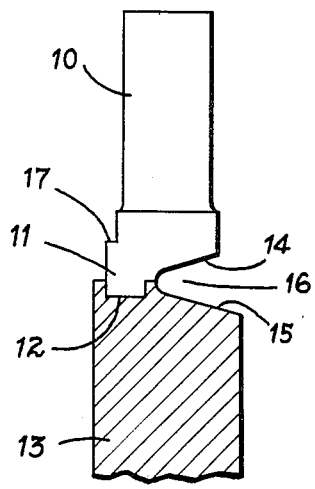

Jan. 22, 1957 C. SCHÖRNER 2,778,095
METHOD OF WELDING TURBINE BLADES
Filed Dec. 24, 1952

INVENTOR.
CHRISTIAN SCHÖRNER
BY
Marechal Biebel French & Bugg
ATTORNEYS

2,778,095
METHOD OF WELDING TURBINE BLADES

Christian Schörner, Augsburg, Germany, assignor to Maschinenfabrik Augsburg-Nürnberg A. G., Augsburg, Germany, a corporation of Germany Application December 24, 1952, Serial No. 327,715

Claims priority, application Germany January 3, 1952

3 Claims. (Cl. 29—156.8)

This invention relates to turbines, and more particularly to a process and means for mounting and aligning turbine blades around the rim of a turbine rotor.

If it is desired to affix turbine blades to the rim of a turbine rotor by, for example, an X-seam weld, it has been found difficult to maintain exact alignment and uniformity of positioning of the blades. In particular, localized heating during the welding operation has been found to produce misalignment of the blades during welding despite the use of various jigs for holding the blades aligned. Such misalignment or nonuniformity, although minor, may alter the optimum aerodynamic layout desired in the finished turbine.

It is accordingly an object of this invention to provide a process for welding turbine blades around the rim of a turbine rotor without the occurrence of misalignment of the blades or nonuniformity of their angles with the rotor.

A further object of this invention is to provide means for temporarily maintaining turbine blades aligned around the rim of a turbine rotor while the blades are being welded to the rotor.

Still another object of this invention is to provide turbine blades and a turbine rotor with interfitting cooperating members for temporarily maintaining the blades on the rotor in aligned position while at least part of the welded joint is produced.

Still a further object of this invention is to provide a method for maintaining turbine blades in aligned position around a rotor rim while an X-seam welded joint is produced between the blades and the rotor.

Other objects and advantages of this invention will be apparent from the following description, the accompanying drawings, and the appended claims.

In the drawing—

Figure 2:
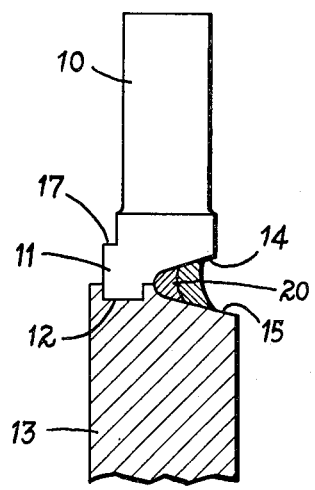
Figure 3:
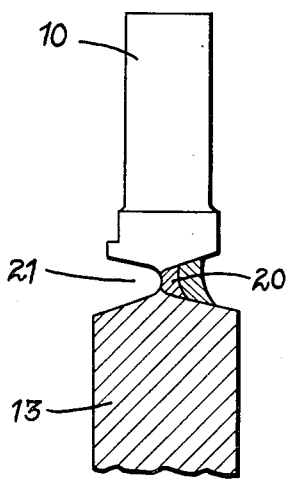
Figure 4:
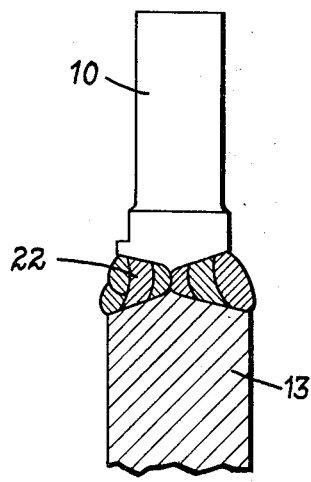

Fig. 1 is a view partly in section showing a turbine blade fitted to the rim of a turbine rotor prior to welding; and Figs. 2–4 are views similar to Fig. 1 showing various stages in the welding process according to this invention.

A so-called X-seam weld is conventionally produced by holding the two parts to be welded in abutting relation while previously formed gaps along the joint between the parts are filled with a welding bead. If gaps are left on both sides of the joint, the resulting welded joint has somewhat the configuration of an X in cross-section, and hence the designation X-seam weld.

The final aligning of the two welded parts necessarily depends upon the manner in which they are held together during the welding operation. Particularly with a plurality of turbine blades around the rim of a turbine rotor, it has been found that various jigs or other devices used to hold the blades on to the rotor during the welding operation admit of enough play in the blades, particularly in view of the localized heating occasioned by the welding operation, so that all of the blades may not remain uniformly aligned to produce the proper and desired final configuration.

According to this invention, however, the X-seam weld may be accomplished in two stages, and the blades and turbine rotor may be so arranged as to hold the blades aligned about the rotor during at least part of the welding operation and until the blades are permanently affixed to the rotor.

Thus, as indicated in Fig. 1, the turbine blade 10 is formed with an offset lug or aligning member 11 which fits into a cooperating groove 12 around the rim of the turbine rotor 13. The bottom portion of the blade 10 and a portion of the rim of the rotor 13 have cooperating surfaces 14 and 15 which form a gap 16 to receive the welding bead at one side of the joint. The blade may also be formed with a shoulder 17 for receiving a jig (not shown) or other device to press the blades tightly against the rotor rim during the welding operation.

With the blades aligned about the rotor, one or more welding beads 20 are laid in the gap 16. With all of a plurality of blades fitted around a turbine rotor and held in alignment by the aligning members 11 engaging the groove 12, the welding bead 20 is continuously laid around the entire rotor thereby permanently affixing all the blades in aligned position avoiding misalignment or nonuniform shifting of the blades.

After one or more welding beads 20 have been laid in the gap 16, the other side of the joint is machined out as shown in Fig. 3 producing a second gap 21 for the completion of the X-seam weld. During this machining step, the blades all remain welded firmly to the rotor rim at 20 so that the gap 21 is produced uniformly around all the blades and the rotor. A small part of the point of the first welding bead 20 is also machined out at this time as shown in Fig. 3 to enhance the strength of the final X-seam weld.

Thereafter additional welding beads 22 are laid in the gap 21 and the entire welding completed on both sides of the rotor as in Fig. 4. Additional welding beads are added and the X-seam weld completed as desired until the gaps 16 and 21 are completely welded with one or more welding beads according to the strength and configuration of the joint desired.

By adjusting the inclination of lug 11 and the configuration of groove 12, a uniform alignment of the blades is attained and their proper angle with respect to the rotor assured. Thus this invention simplifies using a single type of mass produced blade for different grid layouts in that the inclination of the lug 11 may be altered to achieve a desired angle of the blade with the rotor. The invention is particularly adapted with slightly ductile steels with high heat expansion and small heat conductivity (e. g., austenite) and provides accurate control of fissures or imperfections in the weld seam. It will also be apparent that structural reasons or manufacturing considerations in some cases may indicate the provision of a lug or ridge on the rotor and a cooperating groove in the blade roots as means for temporarily holding the blades during the welding operation.

While the process and product herein described constitute preferred embodiments of the invention, it is to be understood that the invention is not limited to this precise process and product, and that changes may be made therein without departing from the scope of the invention which is defined in the appended claims.

What is claimed is:

1. The method of welding a turbine blade around the rim of a turbine rotor comprising the steps of forming a groove in the rim of said rotor, forming an aligning lug at the radially inner end of said blade along one edge thereof for interlocking engagement with said groove in said rotor, forming on said blade and said rotor adjacent said lug and said groove cooperating surfaces to provide a welding gap between said blade and said rotor adjacent said lug and said groove, mounting said blade on said rotor with said lug engaged in said groove to form an interlocking joint positioning and supporting said blade on said rotor against thermally induced deformations during welding, welding a first seam between said blade and said rotor in said welding gap uniting said blade and said rotor adjacent said interlocking joint, thereafter machining away said lug and said groove forming a second welding gap between said blade and said rotor adjacent said first seam and aligned therewith, and welding another seam in said gap joining said first seam to unite said blade to said rotor substantially throughout contiguous areas thereof.

2. The method of forming a continuous X-seam weld uniting a turbine blade to a turbine rotor substantially throughout the contiguous areas thereof, comprising the steps of forming an aligning lug at the radially inner end of said blade and laterally offset from the center line thereof, forming a welding gap surface at the same end of said blade and adjacent said aligning lug, forming a groove in the rim of said rotor for interlocking engagement with said lug, forming a welding gap surface on said rotor adjacent said groove, mounting said blade on said rotor with said lug engaged in said groove for supporting and positioning said blade on said rotor during welding, said welding gap surfaces on said blade and said rotor cooperating to define a welding gap adjacent said lug and said groove and aligned therewith but laterally spaced therefrom, welding a first seam in said welding gap uniting said blade and said rotor, thereafter machining away said lug and said groove to form another welding gap on the opposite side of said blade from said first welding gap and aligned therewith, and welding a second seam in said second welding gap joining said first seam to unite said blade to said rotor substantially throughout contiguous areas thereof.

3. In a method of welding a turbine blade having an offset aligning lug at the radially inner end thereof to the rim of a turbine rotor having a groove for interlocking engagement with said lug and in which surface portions of said blade and said rotor adjacent said lug and said groove respectively cooperate to form a welding gap adjacent said lug and groove and aligned therewith, the steps which comprise mounting said blade on said rotor with said lug interlockingly engaged in said groove for affixing said blade in position for welding to said rotor and for supporting said blade against thermally induced deformations during welding, welding a first seam between said blade and said rotor in said welding gap adjacent said interlocked groove and lug and circumferentially aligned therewith, thereafter machining away portions of said blade and said rotor including said lug and said groove forming a second welding gap on the opposite side of said blade and circumferentially aligned with said first seam, and welding a second seam in said second gap joining said first seam.

References Cited in the file of this patent
UNITED STATES PATENTS

| | | |
|---|---|---|
| 1,347,327 | Dickinson | July 20, 1920 |
| 2,392,281 | Allen | Jan. 1, 1946 |
| 2,405,146 | Huber | Aug. 6, 1946 |

FOREIGN PATENTS

| | | |
|---|---|---|
| 881,604 | France | Jan. 28, 1943 |